(12) United States Patent
Sabharwal et al.

(10) Patent No.: US 10,545,733 B2
(45) Date of Patent: Jan. 28, 2020

(54) CODE REUSABILITY

(71) Applicant: HCL TECHNOLOGIES LIMITED, Noida, Uttar Pradesh (IN)

(72) Inventors: Navin Sabharwal, Uttar Pradesh (IN); Amit Agrawal, Uttar Pradesh (IN)

(73) Assignee: HCL TECHNOLOGIES LTD., Noida, Uttar Pradesh (IN)

( * ) Notice: Subject to any disclaimer, the term of this patent is extended or adjusted under 35 U.S.C. 154(b) by 31 days.

(21) Appl. No.: 16/017,406

(22) Filed: Jun. 25, 2018

(65) Prior Publication Data

US 2019/0391792 A1    Dec. 26, 2019

(51) Int. Cl.
*G06F 8/36* (2018.01)
*G06N 3/08* (2006.01)

(52) U.S. Cl.
CPC ........ *G06F 8/36* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 7,454,413 B2 * | 11/2008 | Lakshminarayanan | G06F 16/832 |
| 7,716,253 B2 * | 5/2010 | Netz | G06Q 10/06 707/803 |
| 8,572,560 B2 | 10/2013 | Drissi et al. | |
| 9,092,211 B2 | 7/2015 | Ng et al. | |
| 9,244,658 B2 | 1/2016 | Beckwith et al. | |
| 9,519,464 B2 * | 12/2016 | Dang | G06F 8/36 |
| 9,619,211 B2 | 4/2017 | McCollum et al. | |
| 2006/0101373 A1 * | 5/2006 | Bartz | G06F 8/20 717/101 |
| 2009/0254880 A1 * | 10/2009 | Gryko | G06F 8/33 717/109 |
| 2012/0174061 A1 * | 7/2012 | McCollum | G06F 8/33 717/106 |

(Continued)

OTHER PUBLICATIONS

Subhasis Das et al., Contextual Code Completion Using Machine Learning, 2015 (Year: 2015).*

(Continued)

*Primary Examiner* — Chat C Do
*Assistant Examiner* — Douglas M Slachta
(74) *Attorney, Agent, or Firm* — Patent Portfolio Builders PLLC

(57) ABSTRACT

Disclosed is a system for facilitating reusability of a code snippet during development of a software application. Initially, a plurality of tokens is extracted, by using an Artificial Intelligence (AI) based syntactic analysis, from a sequence of lines of code entered by a developer. Further, each token of the plurality of tokens is converted into a vector by using a neural word embedding technique. Subsequently, a context of the plurality of tokens is determined by using a deep autoencoder neural network technique. Furthermore, at least one code snippet is recommended from a plurality of code snippets corresponding to the context. To do so, the context is compared with a plurality of contexts by using a Deep Recurrent Neural Network (Deep RNN) technique. Upon comparison, a confidence score is computed for each code snippet. Finally, the at least one code snippet is selected based on the confidence score.

15 Claims, 6 Drawing Sheets

(56) References Cited

U.S. PATENT DOCUMENTS

| | | | |
|---|---|---|---|
| 2013/0007700 A1* | 1/2013 | Villar | G06F 8/33 |
| | | | 717/109 |
| 2014/0109042 A1* | 4/2014 | Christensen | G06F 8/34 |
| | | | 717/109 |
| 2014/0173563 A1* | 6/2014 | Dias | G06F 8/36 |
| | | | 717/123 |
| 2014/0237449 A1* | 8/2014 | Hey | G06F 8/73 |
| | | | 717/123 |
| 2014/0304490 A1* | 10/2014 | Toyama | G06F 8/451 |
| | | | 712/30 |
| 2016/0103662 A1* | 4/2016 | Di Balsamo | G06F 16/3331 |
| | | | 717/107 |
| 2016/0357519 A1 | 12/2016 | Vargas | |
| 2017/0213126 A1 | 7/2017 | Hammond et al. | |
| 2017/0371629 A1* | 12/2017 | Chacko | G06F 8/36 |

OTHER PUBLICATIONS

Chang Liu et al., Neural Code Completion, 2017 (Year: 2017).*
John Karsten Anvik, "Assisting Bug Report Triage through Recommendation", Thesis, The University of British Columbia, Nov. 2007, pp. 1-138.
Marcel Bruch et al., "Learning from Examples to Improve Code Completion Systems", Software Technology Group, Darmstadt University of Technology, Aug. 2009.
Suresh Thummalapenta et al., "PARSEWeb: A Programmer Assistant for Reusing Open Source Code on the Web", Nov. 2007.

* cited by examiner

CODE REUSABILITY

PRIORITY INFORMATION

This patent application does not claim priority from any application.

TECHNICAL FIELD

The present subject matter described herein, in general, relates to a field of software development and more particularly to facilitating reusability of a code snippet during development of a software application, wherein the reusability is facilitated by implementation of one or more Artificial Neural Network techniques.

BACKGROUND

In the field of software development, typically, each developer writes his/her own software code to create a software application. Often, the software application may comprise one or more functional blocks similar to other software application developed by some other developer. As the developer is unaware of the other software application, the developer has to write the software code for the one or more functional blocks again. In this scenario, efforts of the developer have been wasted in rewriting already coded functional blocks. To overcome the aforementioned issue, conventional systems and methodologies proposes use of a code repository to store the one or more functional blocks used in software development. However, the one or more functional blocks are limited to only one programming language and not to different programming languages. Thus, if a same logic is implemented in a functional block written in different programming language, the developer may not be able to reuse the functional block. In addition, the conventional systems and methodologies fail to update the code repository in real time.

SUMMARY

Before the present systems and methods, are described, it is to be understood that this application is not limited to particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for facilitating reusability of a code snippet during development of a software application and the concepts are further described below in the detailed description. This summary is not intended to identify essential features of the claimed subject matter nor is it intended for use in determining or limiting the scope of the claimed subject matter.

In one implementation, a method for facilitating reusability of a code snippet during development of a software application is disclosed. In order to facilitate reusability, initially, a plurality of tokens may be extracted from a sequence of lines of code entered by a developer during development of a software application. The plurality of tokens may indicate at least one of data structures, language constructs, and type of variables. In one aspect, the plurality of tokens may be extracted by using an Artificial Intelligence (AI) based syntactic analysis. Upon extracting the plurality of tokens, each token of the plurality of tokens may be converted into a vector by using a neural word embedding technique. Subsequently, a context of the plurality of tokens may be determined by using a deep autoencoder neural network technique on a plurality of vectors associated to the plurality of tokens. Further to determining the context, at least one code snippet may be recommended from a plurality of code snippets corresponding to the context. In order to do so, the context may be compared with a plurality of contexts, associated to a plurality of code snippets coded in at least one programming language, by using a Deep Recurrent Neural Network (Deep RNN) technique. The plurality of contexts may be pre-stored in a representational data repository. Upon comparison, a confidence score may be computed for each code snippet based on the comparison, of the context with the plurality of contexts. After computing the confidence score, the at least one code snippet may be selected from the plurality of code snippets based on the confidence score thereby facilitating reusability of the code snippet during development of the software application. In another aspect, the aforementioned method for removing a bug present in a software code may be performed by a processor using programmed instructions stored in a memory.

In another implementation, a system for facilitating reusability of a code snippet during development of a software is disclosed. The system may comprise a processor and a memory coupled to the processor. The processor may execute a plurality of modules present in the memory. The plurality of modules may comprise an extraction module, a conversion module, a determination module, and a recommendation module. The extraction module may extract a plurality of tokens from a sequence of lines of code entered by a developer during development of a software application. The plurality of tokens may indicate at least one of data structures, language constructs, and type of variables. The plurality of tokens may be extracted by using an Artificial Intelligence (AI) based syntactic analysis. The conversion module may convert each token of the plurality of tokens into a vector by using a neural word embedding technique. The determination module may determine a context of the plurality of tokens by using a deep autoencoder neural network technique on a plurality of vectors associated to the plurality of tokens. The recommendation module may recommend at least one code snippet from a plurality of code snippets corresponding to the context. In order to do so, the recommendation module may compare the context with a plurality of contexts, associated to a plurality of code snippets coded in at least one programming language, by using a Deep Recurrent Neural Network (Deep RNN) technique. The plurality of contexts may be pre-stored in a representational data repository. Upon comparison, the recommendation module may compute a confidence score for each code snippet based on the comparison, of the context with the plurality of contexts. After computing the confidence score, recommendation module may select the at least one code snippet from the plurality of code snippets based on the confidence score thereby facilitating reusability of the code snippet during development of the software application.

In yet another implementation, non-transitory computer readable medium embodying a program executable in a computing device for facilitating reusability of a code snippet during development of a software is disclosed. The program may comprise a program code for extracting a plurality of tokens from a sequence of lines of code entered by a developer during development of a software application. The plurality of tokens indicates at least one of data structures, language constructs, and type of variables. The plurality of tokens is extracted by using an Artificial Intelligence (AI) based syntactic analysis. The program may further comprise a program code for converting each token of the plurality of tokens into a vector by using a neural word embedding technique. The program may further comprise a program code for determining a context of the plurality of tokens by using a deep autoencoder neural network technique on a plurality of vectors associated to the plurality of tokens. The program may further comprise a program code for recommending at least one code snippet from a plurality of code snippets corresponding to the context. In order to do so, the context may be compared with a plurality of contexts, associated to a plurality of code snippets coded in at least one programming language, by using a Deep Recurrent Neural Network (Deep RNN) technique. The plurality of contexts may be pre-stored in a representational data repository. Upon comparison, a confidence score may be computed for each code snippet based on the comparison, of the context with the plurality of contexts. After computing the confidence score, the at least one code snippet may be selected from the plurality of code snippets based on the confidence score thereby facilitating reusability of the code snippet during development of the software application.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
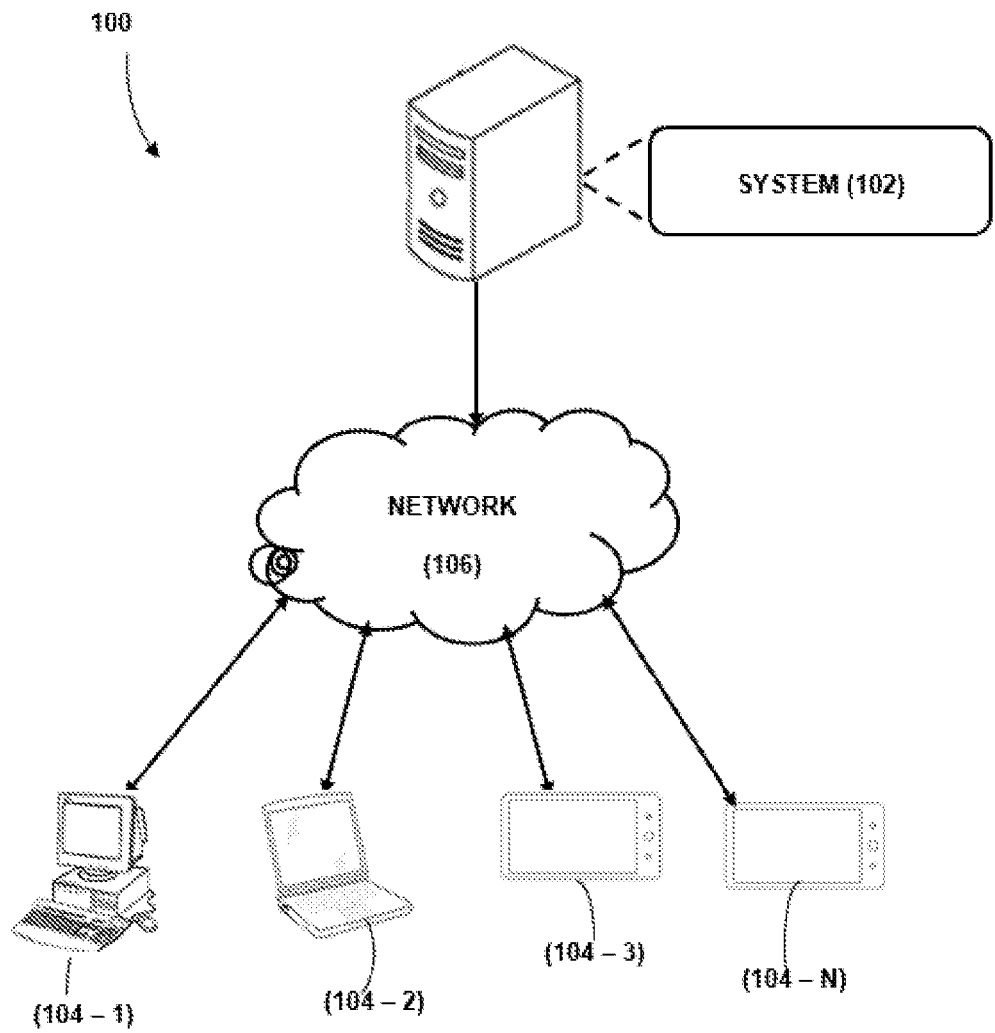
FIG. 1 illustrates a network implementation of a system for facilitating reusability of a code snippet during development of a software application, in accordance with an embodiment of the present subject matter.

Some embodiments of this disclosure, illustrating all its features, will now be discussed in detail. The words "extracting," "converting," "determining," and "recommending," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention tackles limitations of existing system to facilitate reusability of a code snippet during development of a software application. The present invention recommends a ranked list of code snippets to be used during development of the software application. The code snippet refers to a sequence of lines of code capable of performing computation. The present invention may recommend the ranked list of code snippets as soon as a developer starts writing a code. In one embodiment, the present invention may process one or more comments present in the code to recommend the ranked list of code snippets. It is to be noted that the ranked list of code snippets may comprise code snippets written in different languages.

In order to recommend the code snippet, initially, the sequence of lines of code may be received. The sequence of lines of code are entered by the developer during development of the software application. After receiving the sequence of lines of code, the present invention may identify one or more code snippets similar to the sequence of lines of code by using Artificial Intelligence (AI) based system. It is to be noted that the one or more code snippets may be written in different programming languages including, but not limited to, java, .net, python, ruby, perl, C, and C#.

In order to identify the one or more code snippets, a context of the sequence of lines of code must be determined. Subsequently, the context may be compared with a plurality of contexts associated to a plurality of code snippets coded in at least one programming language. It is to be noted that the plurality of code snippets may be stored in a representational data repository. The representational data repository comprises the plurality of code snippets mapped to the plurality of contexts. The representational data repository implements Neural Network based encoders and decoders. The encoders and decoders implements machine translation technique to map the plurality of code snippets to the plurality of contexts.

Based on the comparison, a confidence score for each code snippet may be computed. Further, the ranked list of code snippets may be recommended based on the confidence score, thereby facilitating reusability of the code snippet during development of the software application.

In one embodiment, the present invention may train the AI based system by exposing to new environment during initial training process. The AI based system may utilize an active learning technique. As the active learning technique, the AI based system recommends the ranked list of code snippets to developers during development so that the developers may provide the feedback. In one aspect, the feedback may be whether the recommendation is correct or not. In order words, the AI based system may learn from the feedback provided by developers during application development. In one implementation, the AI based system may be configured as a plugin in an Interactive Development Environment (IDE) for at least one programming language.

In another embodiment, the AI based system may utilize a reinforcement learning technique to train when exposed to one or more projects written in different programming language. The reinforcement learning technique is a reward and penalty based learning system. The reinforcement learning technique may employ one or more software agent(s) to work as human agents and provide feedback in terms of reward and penalty to the AI based system for each recommendation.

While aspects of described system and method for facilitating reusability of a code snippet during development of a software application and may be implemented in any number of different computing systems, environments, and/or configurations, the embodiments are described in the context of the following exemplary system.

Referring now to FIG. 1, a network implementation 100 of a system 102 for facilitating reusability of a code snippet during development of a software application is disclosed. In order to remove the bug, initially, the system 102 may extract a plurality of tokens from a sequence of lines of code entered by a developer during development of a software application. The plurality of tokens may indicate at least one of data structures, language constructs, and type of variables. The plurality of tokens may be extracted by using an Artificial Intelligence (AI) based syntactic analysis. Upon extracting the plurality of tokens, the system 102 may convert each token of the plurality of tokens into a vector by using a neural word embedding technique. After conversion, the system 102 may determine a context of the plurality of tokens by using a deep autoencoder neural network technique on a plurality of vectors associated to the plurality of tokens. Subsequently, the system 102 may recommend at least one code snippet from a plurality of code snippets corresponding to the context. In order to do so, the system 102 may compare the context with a plurality of contexts, associated to a plurality of code snippets coded in at least one programming language, by using a Deep Recurrent Neural Network (Deep RNN) technique. The plurality of contexts may be pre-stored in a representational data repository. Upon comparison, the system 102 may compute a confidence score for each code snippet of the context with the plurality of contexts. After computing the confidence score, the system 102 may select the at least one code snippet from the plurality of code snippets based on the confidence score thereby facilitating reusability of the code snippet during development of the software application.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications.

Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
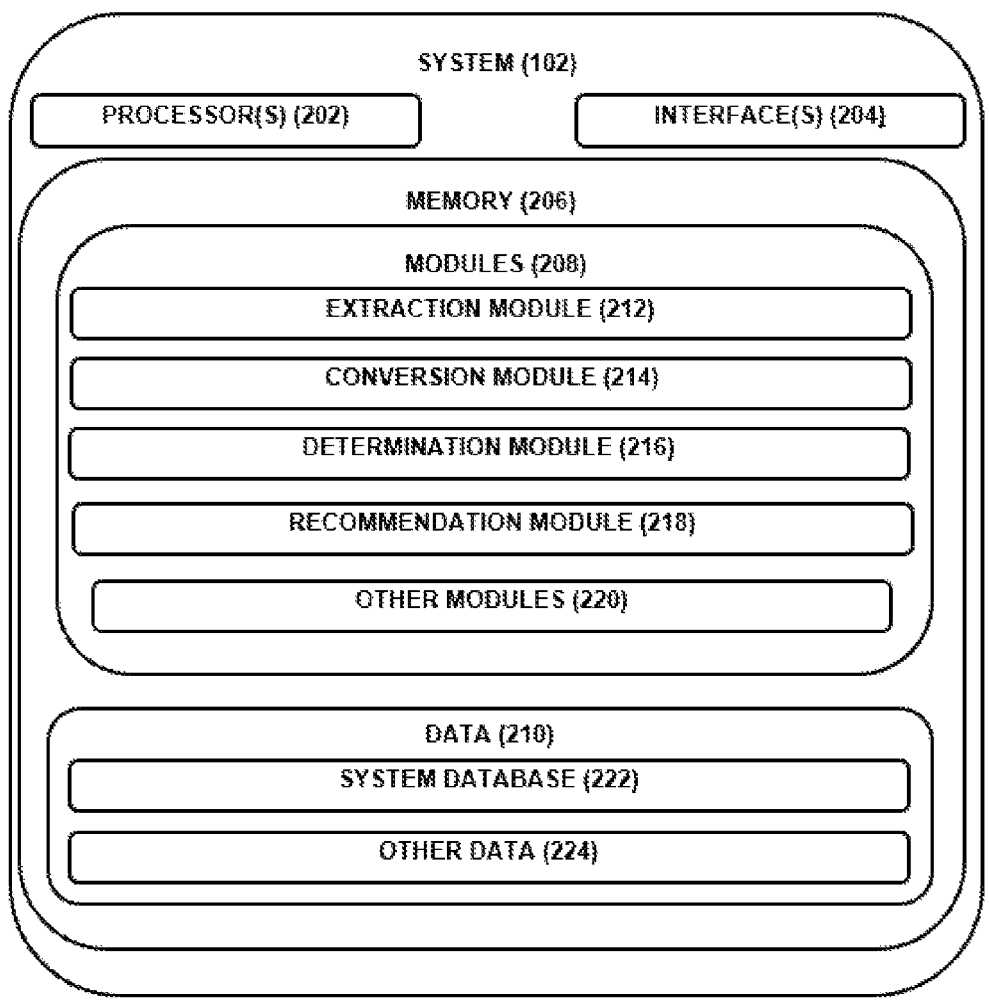
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an extraction module 212, a conversion module 214, a determination module 216, and a recommendation module 218, and other modules 220. The other modules 220 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 222 and other data 224. The other data 224 may include data generated as a result of the execution of one or more modules in the other modules 220.

As there are various challenges observed in the existing art, the challenges necessitate the need to build the system 102 for facilitating reusability of a code snippet during development of a software application. In order to facilitate reusability of the code snippet, at first, a user may use the client device 104 to access the system 102 via the I/O interface 204. The user may register them using the I/O interface 204 in order to use the system 102. In one aspect, the user may access the I/O interface 204 of the system 102. The system 102 may employ the extraction module 212, the conversion module 214, the determination module 216, and the recommendation module 218. The detail functioning of the modules is described below with the help of figures.

The present system 102 facilitates reusability of a code snippet during development of a software application. In order to do so, initially, the extraction module 212 extracts a plurality of tokens from a sequence of lines of code entered by a developer during development of a software application. The plurality of tokens may indicate at least one of data structures, language constructs, and type of variables. The plurality of tokens may be extracted by using an Artificial Intelligence (AI) based syntactic analysis. In one embodiment, the extraction module 212 may extract the plurality of tokens from one or more comments present in the software application. The plurality of tokens may be extracted by implementing Natural Language Processing (NLP) techniques including, but not limited to, stopword removal, part of speech tagging, entity recognition and lemmatization.

Further to extraction of the plurality of tokens, the conversion module 214 converts each token of the plurality of tokens into a vector by using a neural word embedding technique. It is to be noted that each token is converted into the vector by using the neural word embedding techniques. Example of the neural word embedding techniques including, but not limited to, a Word2Vec model, a GloVe (Global Vectors for Word Representation) model, a Context2vec model, and a Doc2Vec model. By implementation of the neural word embedding techniques the sequence of lines of code are converted into numerical vectors to be utilized in machine learning based analysis.

Upon conversion, the determination module 216 determines a context of the plurality of tokens by using a deep autoencoder neural network technique on a plurality of vectors associated to the plurality of tokens. The deep autoencoder neural network technique implements Artificial Neural Network (ANN) based machine translation technique to determine the context. It is to be noted that context indicates an outcome of the sequence of lines of code. In other words, the context refers to output of the sequence of lines of code.

After determination of the context, the recommendation module 218 recommends at least one code snippet from a plurality of code snippets corresponding to the context. In order to do so, the recommendation module 218 may identify type of statements present in the sequence of lines of code based on a Deep Convolution Neural Network (Deep CNN) technique. The type of statement comprises a conditional statement, an iterative statement, a declarative statement, and an initialization statement. Further, the recommendation module 218 may compare the context with a plurality of contexts, associated to the plurality of code snippets coded in at least one programming language, by using a Deep Recurrent Neural Network (Deep RNN) technique. The plurality of contexts may be pre-stored in a representational data repository. The representational data repository comprises the plurality of code snippets mapped to at least one context from the plurality of contexts. The plurality of code snippets may be coded in at least one programming language including, but not limited to, C#, java, dot net, ruby, perl, C, and javascript. In one implementation, the representational data repository may comprise mapping of the plurality of tokens to the at least one context. The representational data repository implements the neural network based deep auto encoders and deep auto decoders to translate the plurality of code snippets into at least one of the plurality of the contexts. In one implementation, at least one of the plurality of the contexts may be pre-stored in the representational data repository. In other words, the representational data repository indicates vector mapping of the at least one of the plurality of contexts with the plurality of the code snippets. For example, consider codes "print 'Hello World'" and "System.out.println ('Hello World')" in python and java respectively. As the context of the codes is same i.e. to print "Hello World", the representational data repository maps the codes as equal.

In addition, the recommendation module 218 computes a confidence score for each code snippet based on the comparison with the at least one of the plurality of the contexts. The confidence score may be computed based on similarity of the context of the code snippet with at least one of the plurality of contexts. After computing the confidence score, recommendation module 218 may select the at least one code snippet from the plurality of code snippets. In one embodiment, the recommendation module 218 may rank the plurality of code snippets in a descending manner of the confidence score. In addition, the recommendation module 218 may select a predefined count of code snippets from the plurality of ranked code snippets. In an alternative embodiment, the recommendation module 218 may recommend the at least one code snippet based on the type of statement along with the context.

Once the at least one code snippet is selected, the recommendation module 218 may translate the at least one code snippet into a programming language corresponding to the sequence of lines of code. It is to be noted that the recommendation module 218 may implement a neural network based decoder technique to translate the at least one code snippet into the programming language corresponding to the sequence of lines of code. The deep auto decoder technique is based on Natural Language Processing technique for converting the code snippet into the programming language of the sequence of lines. Subsequently, the recommendation module 218 may amend the sequence of lines of code in accordance with the translated code snippet thereby facilitating reusability of the code snippet during development of the software application.

In one embodiment, the system may be trained by using at least one of an active learning and a reinforcement learning technique. The Active learning technique refers to a probing based learning system wherein human feedback would be captured for current code snippets against plurality of code snippets available in the system 102. In active learning, the developer of the software application provides feedback to enrich the recommendation of the system 102. In one case, if the developer provides feedback for code snippet, the system 102 may capture this and enrich the recommendation module 218 to recommend code snippets if same type of code snippets comes in future for which feedback has already been provided.

The reinforcement learning technique implements Artificial Intelligence (AI) based agents to examine correctness of the recommended code snippet. In one aspect, when the recommended code snippet is not correct the AI based agents would penalize the recommendation module 218. In another aspect, when the recommended code snippet is correct, the AI based agents may reward the recommendation module 218.

In one implementation, the system 102 may be exposed to different environments simultaneously. Each environment of the different environments refers to the software application under development in one programming language. When the system 102 is exposed to multiple environment simultaneously, the AI based agents starts training the system 102 by using the reinforcement learning. It is to be noted that each AI based agent may be deployed in one environment of the new environments. Thus, each AI based agent, from one environment, may be configured to share knowledge about the sequences of lines code with other AI based agent, in other environment of the new environments, by using transfer learning technique. In other words, firstly, the AI based agents train the system 102 by using the reinforcement learning technique in the different environments. Secondly, the AI based agents share learned knowledge with each other using the transfer learning technique to provide the ranked list of code snippets independent of the programming language.

Figure 3:
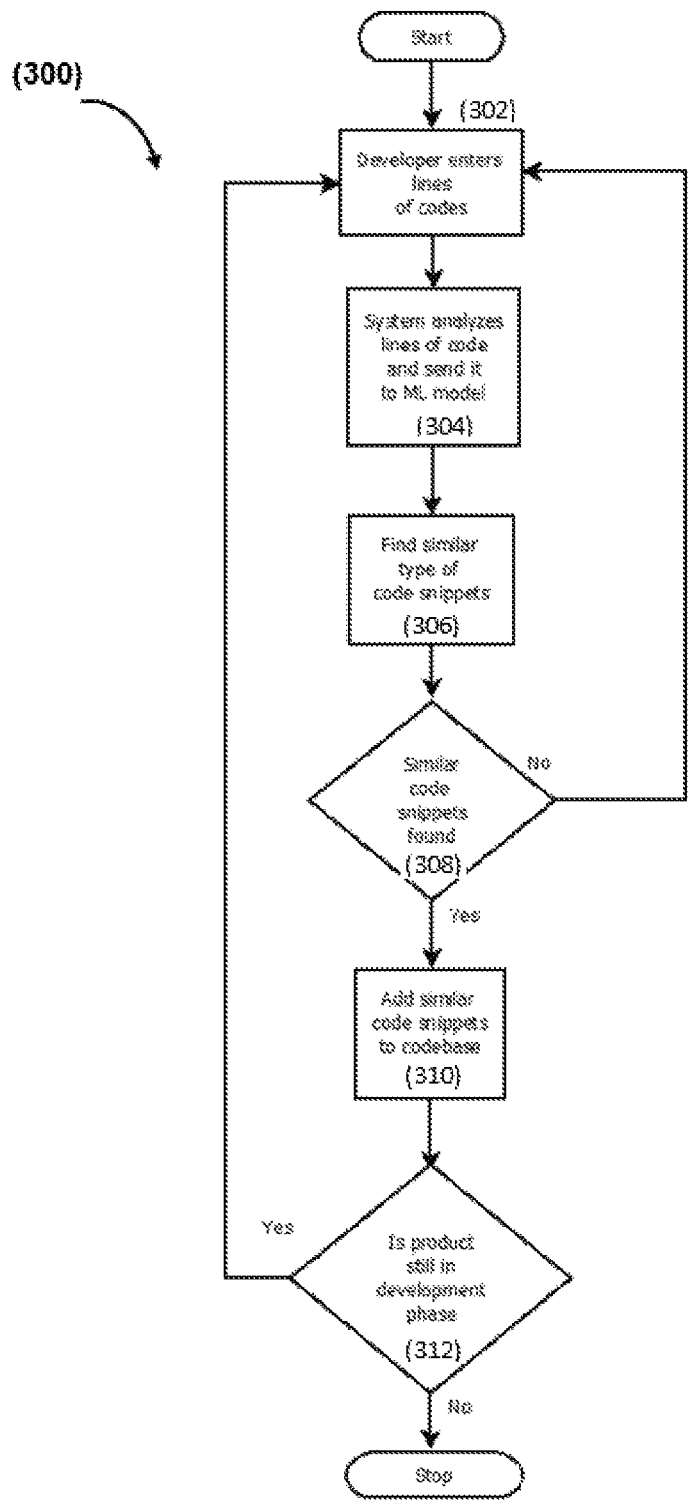
FIG. 3 illustrates a workflow for generating a representational data repository, in accordance with an embodiment of the present subject matter.

Referring now to FIG. 3, a workflow 300 for generating a representational data repository is shown, in accordance with an embodiment of the present subject matter. Initially, at block 302, the system 102 receives lines of code entered by a developer during development of the software application. At block 304, the extraction module 212 analyses the lines of code to extract a plurality of tokens. Further, the conversion module 214 converts the plurality of tokens into a vector by using a neural word embedding technique. At block 306, the recommendation module 216 compares the context, associated to the plurality of tokens, with a plurality of contexts associated to the plurality of code snippets coded in at least one programming language. At block 308, a confidence score for each code snippet is computed to identify a code snippet having similar context as that of the lines of code entered by the developer. If the similar code snippet is identified, at block 310, the system 102 may add the code snippet to the representational data repository. If the similar code snippet is not identified, the system 102 may further, at block 302, receive the lines of the code to recommend another code snippet similar to the context. Furthermore, at block 312, if the software application is still in the development phase, the system 102 may repeat the above process starting from the block 302.

Figure 4:
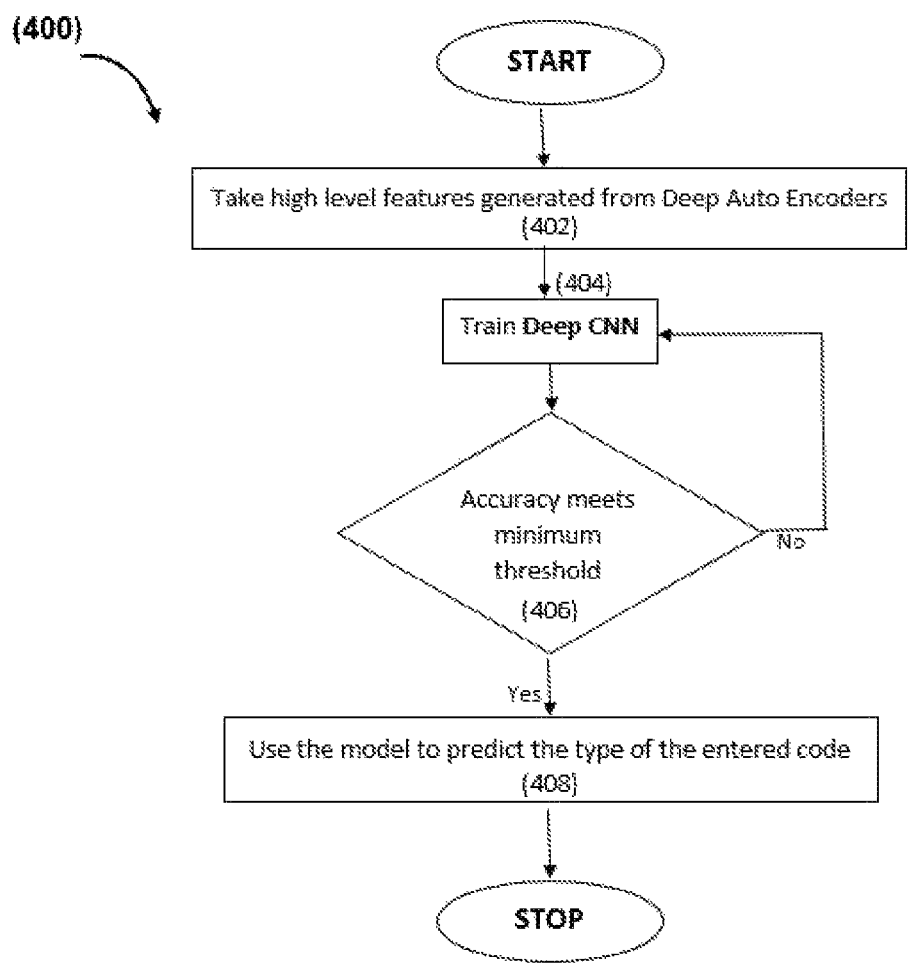
FIG. 4 illustrates a workflow for predicting a code snippet, in accordance with an embodiment of the present subject matter.

Referring now to FIG. 4, a workflow 400 for predicting a code snippet is shown, in accordance with an embodiment of the present subject matter. At block 402, the system 102 takes the context of the plurality of tokens determined by using a deep autoencoder neural network technique on a plurality of vectors associated to the plurality of tokens. At block 404, the system 102 is trained by using the Deep CNN to create a model for predicting the code snippet corresponding to the context. At block 406, an accuracy of the model is compared with a predefined minimum threshold. The predefined minimum threshold is calculated by running the system 102 for different values of threshold and selecting an optimal threshold value. The accuracy refers to the accuracy of the model to identify a code snippet similar to the context.

In one aspect, the code snippet may be present in the representational data repository. When the accuracy of the model is less than the predefined minimum threshold, the model may undergo training again. When the accuracy of the model is greater than the predefined minimum threshold, at block 408, the model is used to predict at least one code snippet similar to the context.

Figure 5:
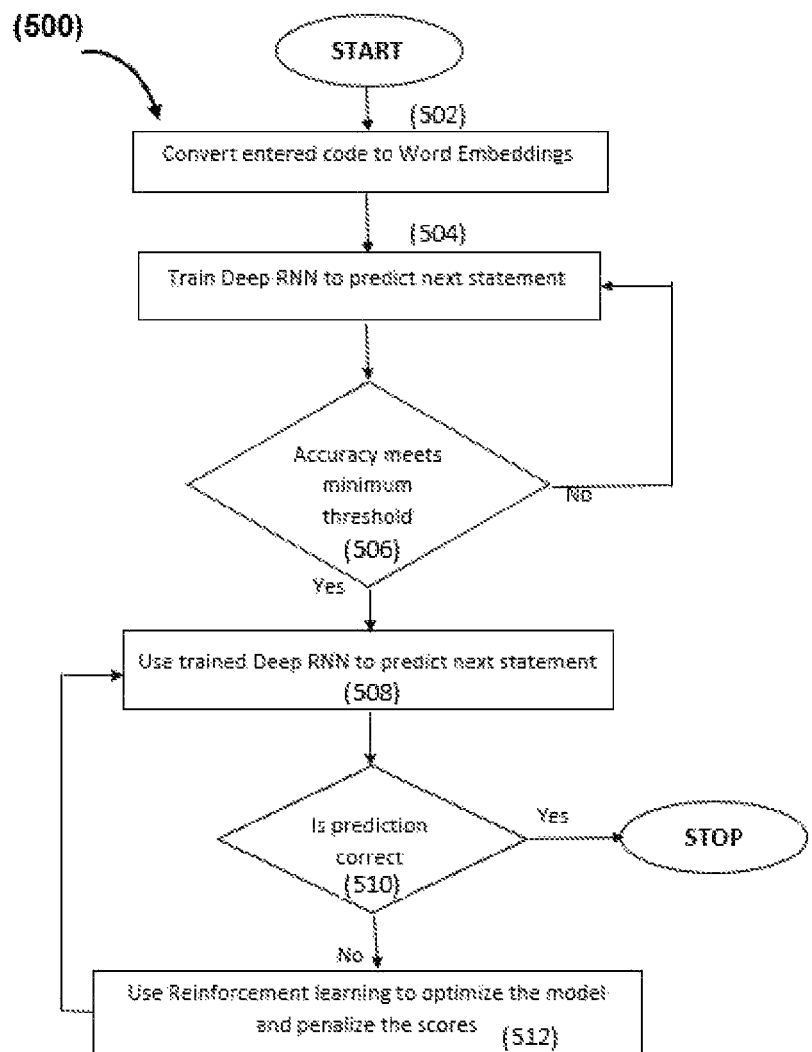
FIG. 5 illustrates a workflow for training the system, in accordance with an embodiment of the present subject matter.

Referring now to FIG. 5, a workflow 500 for training the system is shown, in accordance with an embodiment of the present subject matter. At block 502, the lines of code entered by the developer is converted into a vector by using a neural word embedding technique. At block 504, the model is trained by using the deep RNN technique to predict the code snippet associated to the context. At block 506, the accuracy of the model is compared with the predefined minimum threshold. When the accuracy of the model meets the predefined minimum threshold, at block 508, the system 102 utilizes the model to predict at least one code snippet similar to the context. At block 510, the determination module 216 determines whether the prediction of the at least one code snippet is correct or not. If the prediction is not correct, at block 512, the system 102 optimizes the prediction of the model by using a penalty based reinforcement learning technique.

Figure 6:
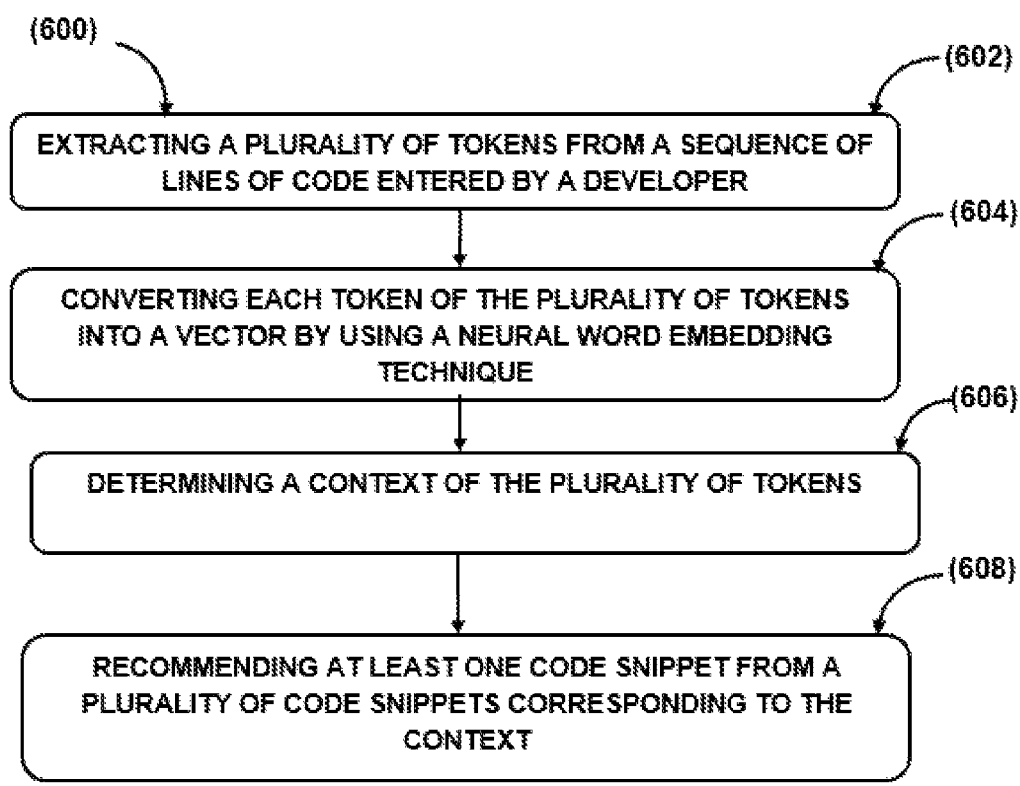
FIG. 6 illustrates a method for facilitating reusability of a code snippet during development of a software application, in accordance with an embodiment of the present subject matter.

Referring now to FIG. 6, a method 600 for facilitating reusability of a code snippet during development of a software application is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 600 for facilitating reusability of a code snippet during development of a software application is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented as described in the system 102.

At block 602, a plurality of tokens may be extracted from a sequence of lines of code entered by a developer. In one implementation, the plurality of tokens may be extracted from a sequence of lines of code entered by a developer during development of a software application by an extraction module 212.

At block 604, each token of the plurality of tokens may be converted into a vector by using a neural word embedding technique. In one implementation, each token of the plurality of tokens may be converted into a vector by using a neural word embedding technique by a conversion module 214.

At block 606, context of the plurality of tokens may be determined. In one aspect, the context of the plurality of tokens may be determined by using a deep autoencoder neural network technique on a plurality of vectors associated to the plurality of tokens. In one implementation, the context of the plurality of tokens may be determined by a determination module 216.

At block 608, at least one code snippet from the plurality of code snippets corresponding to the context may be recommended. In one implementation, the at least one code snippet from the plurality of code snippets corresponding to the context may be recommended by a recommendation module 218.

Exemplary embodiments discussed above may provide certain advantages. Though not required to practice aspects of the disclosure, these advantages may include those provided by the following features.

Some embodiments enable a system and a method to recommend code snippets written in different programming languages.

Some embodiments enable a system and a method to ease software development by using recommended code snippets.

Some embodiments enable a system and a method to map plurality of code snippets in one representational data repository based on context of the sequence of lines of code.

Some embodiments enable a system and a method to update the representational data repository in real time.

Some embodiments enable a system and a method to integrate functionality of code reusability as a plugin in a software development environment including Eclipse, Android studio, visual studio, and others.

Some embodiments enable a system and a method to reduce time and efforts spent for development of software applications.

Although implementations for methods and systems for facilitating reusability of a code snippet during development of a software have been described in language specific to structural features and/or methods, it is to be understood that the appended claims are not necessarily limited to the specific features or methods described. Rather, the specific features and methods are disclosed as examples of implementations for facilitating reusability of a code snippet during development of a software.

The invention claimed is:

1. A method for facilitating reusability of a code snippet during development of a software application, the method comprising:
   extracting, by a processor, a plurality of tokens from a sequence of lines of code entered by a developer during development of a software application;
   converting, by the processor, each token of the plurality of tokens into a vector by using a neural word embedding technique;
   determining, by the processor, a context of the plurality of tokens by using a deep autoencoder neural network technique on a plurality of vectors associated to the plurality of tokens; and
   recommending, by the processor, at least one code snippet from a plurality of code snippets corresponding to the context by,
   comparing the context with a plurality of contexts, associated to the plurality of code snippets coded in at least one programming language, by using a Deep Recurrent Neural Network (Deep RNN) technique, wherein the plurality of contexts is pre-stored in a representational data repository,
   computing a confidence score for each code snippet based on the comparison, of the context with the plurality of contexts,
   selecting the at least one code snippet from the plurality of code snippets based on the confidence score thereby facilitating reusability of the code snippet during development of the software application;
   translating the at least one code snippet into a programming language corresponding to the sequence of lines of code, and
   amending the sequence of lines of code in accordance with the translated code snippet.

2. The method of claim 1, wherein the plurality of tokens is extracted by using an Artificial Intelligence (AI) based syntactic analysis, and wherein the plurality of tokens indicates at least one of data structures, language constructs, and type of variables.

3. The method of claim 1, wherein each token of the plurality of tokens is converted into the vector by using the neural word embedding techniques comprising a Word2Vec model, a GloVe (Global Vectors for Word Representation) model, a Context2vec model, and a Doc2Vec model.

4. The method of claim 1, wherein the recommending the at least one code snippet further comprises
   identifying a type of statement present in the sequence of lines of code based on a Deep Convolution Neural Network (Deep CNN), wherein the type of statement comprises a conditional statement, an iterative statement, a declarative statement, and an initialization statement, and
   recommending the code snippet based on the type of statement along with the context.

5. The method of claim 1, wherein the recommending the at least one code snippet further comprises
   ranking the plurality of code snippets in a descending manner of the confidence score, and
   selecting a predefined count of code snippets from the plurality of ranked code snippets.

6. The method of claim 1, wherein the confidence score is computed based on similarity of the context of the code snippet with at least one of the plurality of contexts pre-stored in a representational data repository.

7. The method of claim 1, wherein the code snippet is recommended by using a reward and a penalty based reinforcement learning technique.

8. A system for facilitating reusability of a code snippet during development of a software, the system comprising:
   a processor; and
   a memory coupled to the processor, wherein the processor is capable of executing a plurality of modules stored in the memory, and wherein the plurality of modules comprising:
   an extraction module for extracting a plurality of tokens from a sequence of lines of code entered by a developer during development of a software application;
   a conversion model for converting each token of the plurality of tokens into a vector by using a neural word embedding technique;
   a determination module for determining a context of the plurality of tokens by using a deep autoencoder neural network technique on a plurality of vectors associated to the plurality of tokens; and
   a recommendation module for recommending at least one code snippet from a plurality of code snippets corresponding to the context by,
   comparing the context with a plurality of contexts, associated to the plurality of code snippets coded in at least one programming language, by using a Deep Recurrent Neural Network (Deep RNN) technique, wherein the plurality of contexts is pre-stored in a representational data repository, computing a confidence score for each code snippet based on the comparison, of the context with the plurality of contexts, selecting the at least one code snippet from the plurality of code snippets based on the confidence score thereby facilitating reusability of the code snippet during development of the software application, wherein the system is further configured to translate the at least one code snippet into a programming language corresponding to the sequence of lines of code, and amend the sequence of lines of code in accordance with the translated code snippet.

9. The system of claim 8, wherein the plurality of tokens is extracted by using an Artificial Intelligence (AI) based syntactic analysis, and wherein the plurality of tokens indicates at least one of data structures, language constructs, and type of variables.

10. The system of claim 8, wherein each token of the plurality of tokens is converted into the vector by using the neural word embedding techniques comprising a Word2Vec model, a GloVe (Global Vectors for Word Representation) model, a Context2vec model, and a Doc2Vec model.

11. The system of claim 8, wherein the recommendation module is further configured to identify a type of statement present in the sequence of lines of code based on a Deep Convolution Neural Network (Deep CNN), wherein the type of statement comprises a conditional statement, an iterative statement, a declarative statement, and an initialization statement, and recommend the code snippet based on the type of statement along with the context.

12. The system of claim 8, wherein the recommendation module is further configured to rank the plurality of code snippets in a descending manner of the confidence score, and select a predefined count of code snippets from the plurality of ranked code snippets.

13. The system of claim 8, wherein the confidence score is computed based on similarity of the context of the code snippet with at least one of the plurality of contexts pre-stored in a representational data repository.

14. The method of claim 8, wherein the code snippet is recommended by using a reward and a penalty based reinforcement learning technique.

15. A non-transitory computer readable medium embodying a program executable in a computing device for facilitating reusability of a code snippet during development of a software, the program comprising:

a program code for extracting a plurality of tokens from a sequence of lines of code entered by a developer during development of a software application;

a program code for converting each token of the plurality of tokens into a vector by using a neural word embedding technique;

a program code for determining a context of the plurality of tokens by using a deep autoencoder neural network technique on a plurality of vectors associated to the plurality of tokens; and a program code for recommending at least one code snippet from a plurality of code snippets corresponding to the context by, comparing the context with a plurality of contexts, associated to the plurality of code snippets coded in at least one programming language, by using a Deep Recurrent Neural Network (Deep RNN) technique, wherein the plurality of contexts is pre-stored in a representational data repository, computing a confidence score for each code snippet based on the comparison, of the context with the plurality of contexts, selecting the at least one code snippet from the plurality of code snippets based on the confidence score thereby facilitating reusability of the code snippet during development of the software application, translating the at least one code snippet into a programming language corresponding to the sequence of lines of code, and amending the sequence of lines of code in accordance with the translated code snippet.

* * * * *